(12) United States Patent
Kerns et al.

(10) Patent No.: US 6,178,944 B1
(45) Date of Patent: Jan. 30, 2001

(54) VALVE CLEANING METHOD FOR DIRECT INJECTION SPARK IGNITION ENGINE

(75) Inventors: James Michael Kerns, Trenton; Michael John Cullen, Northville, both of MI (US)

(73) Assignee: Ford Global Technologies, Inc., Dearborn, MI (US)

(*) Notice: Under 35 U.S.C. 154(b), the term of this patent shall be extended for 0 days.

(21) Appl. No.: 09/387,361

(22) Filed: Aug. 31, 1999

(51) Int. Cl.⁷ ............................. F02B 17/00; F02B 77/04
(52) U.S. Cl. ................. 123/295; 123/198 A; 123/478
(58) Field of Search ..................... 123/90.15, 198 A, 123/295–305, 478

(56) References Cited

U.S. PATENT DOCUMENTS

| | | | |
|---|---|---|---|
| 4,562,817 | 1/1986 | Ito | 123/478 |
| 4,628,880 | 12/1986 | Aoyama et al. | 123/432 |
| 4,703,734 | 11/1987 | Aoyama et al. | 123/432 |
| 5,161,497 | 11/1992 | Simko et al. | 123/90.15 |
| 5,230,320 | * 7/1993 | Hitomi et al. | 123/90.15 X |
| 5,910,096 | 6/1999 | Hepburn et al. | 60/274 |
| 6,032,641 | * 3/2000 | Aketa et al. | 123/299 |

* cited by examiner

Primary Examiner—Tony M. Argenbright
(74) Attorney, Agent, or Firm—Allan J. Lippa

(57) ABSTRACT

A control method and system is described for a spark ignited, four-stroke engine having multiple combustion chambers, each coupled to at least one intake and one exhaust valve, a fuel injection system for injecting fuel directly into each combustion chamber, and an electronically controlled throttle for throttling air inducted through an intake manifold into the combustion chambers. Additional fuel is injected during the exhaust valve overlap. This additional fuel is drawn from the combustion chamber into the intake manifold and subsequently inducted back into the combustion chamber past the intake valve, thereby cleaning carbon deposits from the intake valve and the surrounding surfaces.

16 Claims, 2 Drawing Sheets

VALVE CLEANING METHOD FOR DIRECT INJECTION SPARK IGNITION ENGINE

FIELD OF THE INVENTION

The invention relates to direct injection spark ignition engine.

BACKGROUND OF THE INVENTION

In direct spark ignition engines, fuel is injected directly into each combustion chamber. Accordingly, fuel is not inducted past the intake valve.

The inventors herein have discovered a problem with such engines. Because fuel is not inducted past the intake valve in direct injection spark ignition engines, there is no fuel flow to clean carbon deposits which may deposit on the intake valve. Port injected gasoline engines, on the other hand, induct a mixture of gasoline and air past the intake port. This gasoline mixture cleans carbon deposits which would otherwise accumulate on the intake valve.

SUMMARY OF THE INVENTION

An object of the invention herein is to clean carbon deposits which accumulate on and around the intake valve of a direct injection spark ignition engine.

The above object is achieved, problems of prior approaches overcome, and inherent advantages obtained, by providing a control method and system for a spark ignited, four-stroke engine having multiple combustion chambers, each coupled to at least one intake and one exhaust valve, a fuel injection system for injecting fuel directly into each combustion chamber, and an electronically controlled throttle for throttling air inducted through an intake manifold into the combustion chambers. In one particular aspect of the invention, the method comprises: detecting when to initiate an intake valve cleaning; indicating when the engine is operating in a homogeneous mode wherein the throttle is partially closed and fuel is injected during an engine intake stroke to generate a homogeneous air/fuel mixture; and in response to said valve cleaning detection and said homogeneous mode indication, injecting additional fuel during a valve overlap of the intake and exhaust valves so that fuel is drawn into the intake manifold and subsequently inducted back into the combustion chamber past the intake valve to clean valve deposits.

An advantage of the above aspect of the invention is that fuel injected during the valve overlap cleans carbon deposits accumulated on and around the intake valve.

DESCRIPTION OF THE DRAWINGS

The object and advantages of the invention claimed herein will be more readily understood by reading an example of an embodiment in which the invention is used to advantage with reference to the following drawings, wherein:

DESCRIPTION OF AN EXAMPLE OF OPERATION

Figure 1:
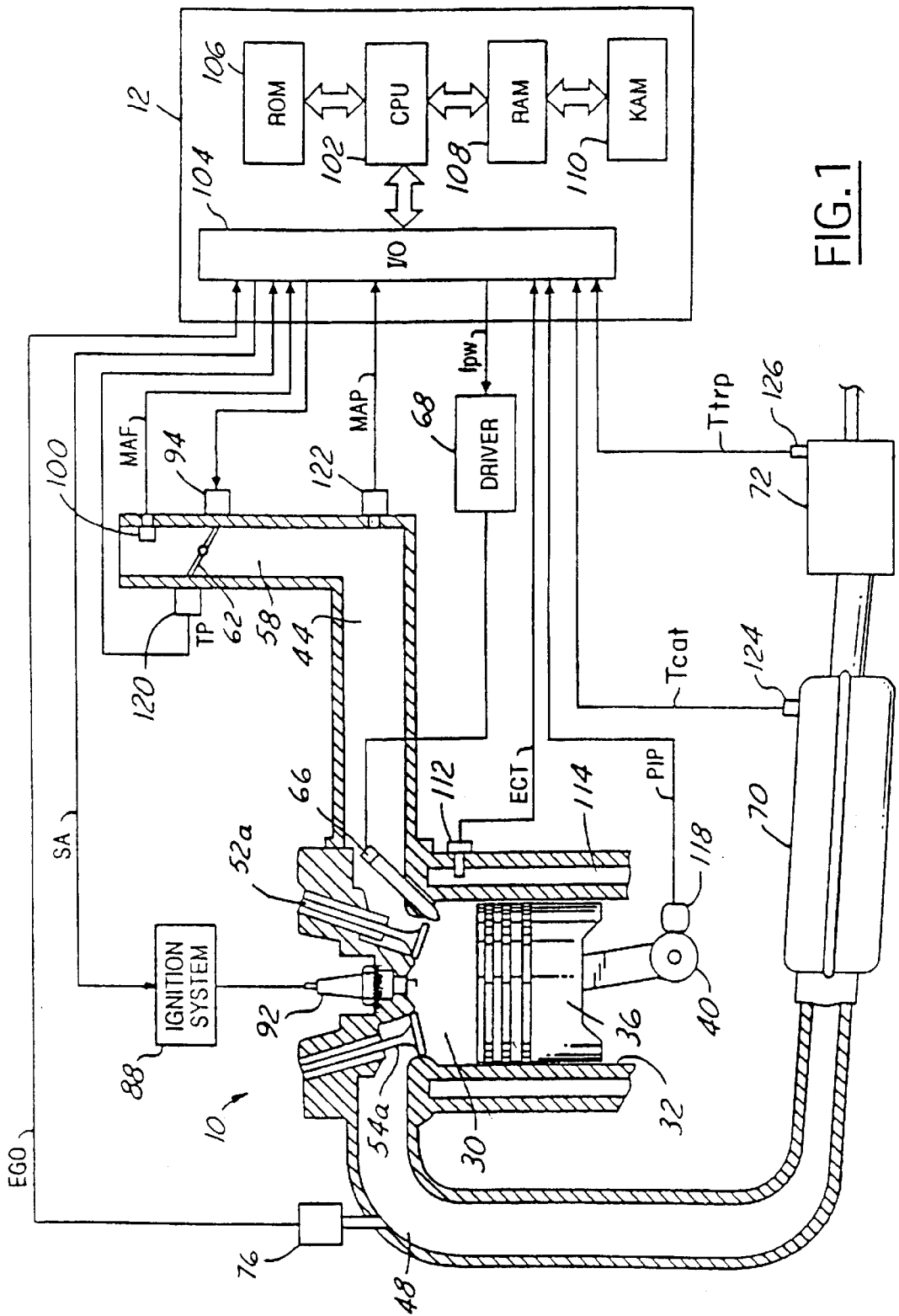
FIG. 1 is a block diagram of an embodiment in which the invention is used to advantage.

Direct injection spark ignited internal combustion engine 10 comprising a plurality of combustion chambers, is controlled by electronic engine controller 12. Combustion chamber 30 of engine 10 is shown in FIG. 1, including combustion chamber walls 32 with piston 36 positioned therein and connected to crankshaft 40. In this particular example, piston 30 includes a recess or bowl (not shown) to help in forming stratified charges of air and fuel. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Signal fpw represents the fuel pulse width in seconds that is sent from controller 12 to driver 68 determining the time duration in which injector 66 is energized. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66 during the engine compression stroke so that fuel is sprayed directly into the bowl of piston 36. Stratified air/fuel layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air/fuel mixture is formed when ignition power is supplied to spark plug 92 by ignition system 88. Controller 12 controls the amount of fuel delivered by fuel injector 66 so that the homogeneous air/fuel mixture in chamber 30 can be selected to be at stoichiometry, a value rich of stoichiometry, or a value lean of stoichiometry. The stratified air/fuel mixture will always be at a value lean of stoichiometry the exact air/fuel ratio being a function of the amount of fuel delivered to combustion chamber 30.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich homogeneous mode or a stoichiometric homogeneous mode.

Controller 12 is shown in FIG. 1 as a conventional microcomputer including: microprocessor unit 102, input/output ports 104, an electronic storage medium for executable programs and calibration values shown as read-only memory chip 106 in this particular example, random access memory 108, keep-alive memory 110 and a conventional data bus. Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and absolute Manifold Pressure Signal MAP from sensor 112. Engine speed signal RPM is generated by controller 12 from signal PIP in a conventional manner and manifold pressure signal MAP provides an indication of engine load.

Figure 2:
FIG. 2 shows injection timing.
Figure 2:
Figure 3:
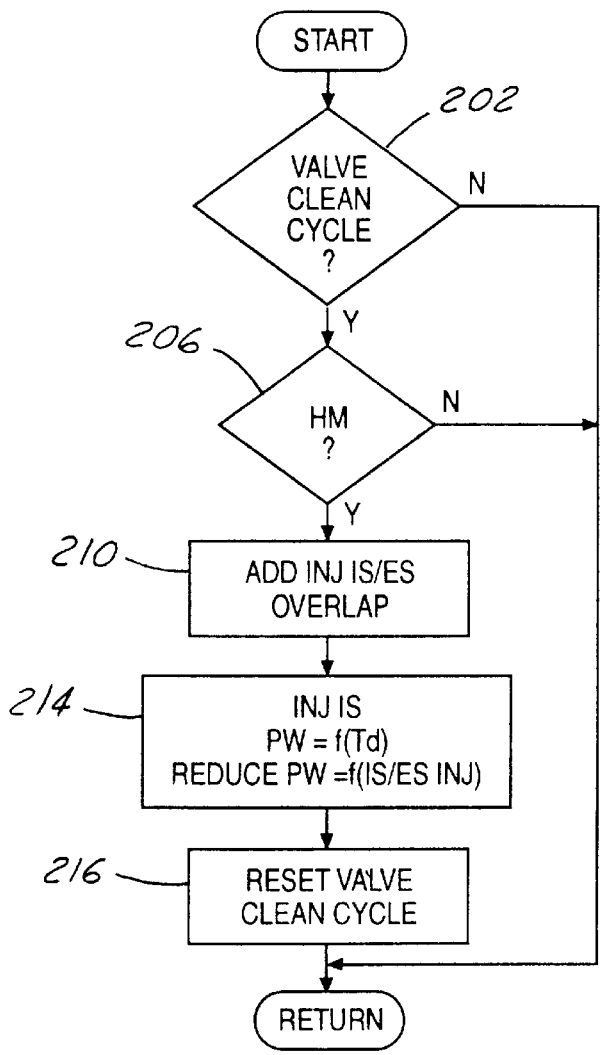
FIG. 3 shows a high level flow chart which depicts a portion of the operation of the embodiment shown in FIG. 1.

Referring to FIGS. 2 and 3, a process is described for removing valve deposits accumulated on and around intake valve 54a and other intake valves not shown in FIG. 1. Those skilled in the art will recognize that the advantage described herein may be used to advantage with both two-valve, three-valve, four-valve, and any other number of intake valve combinations. The invention also provides the advantage of cleaning valve deposits on the intake port adjacent to the intake valve.

FIG. 2 generally describes the injection timing for a four-stroke engine having an intake stroke (I), a compression stroke (C), a power stroke (P), and an exhaust stroke (E). In the particular example shown in FIG. 2, a homogeneous air/fuel mode of operation is shown wherein fuel is injected during the engine intake stroke. In this manner, injected fuel has an opportunity to mix with inducted air so that a homogeneous air/fuel mixture is provided in the combustion chamber during the engine compression stroke and subsequent ignition. An additional fuel injection pulse is illustrated between the engine intake and exhaust strokes. As described in greater detail later herein with particular reference to FIG. 3, this additional fuel pulse is provided only in response to an indication that carbon deposits have accumulated on the intake valves of engine 10.

Referring now to FIG. 3, a high level flow chart is shown describing a method for cleaning carbon deposits accumulated on the intake valves and intake ports. During step 202, an indication is provided that a valve cleaning cycle is required. This indication may be provided by counting a predetermined number of elapsed engine cycles or by accumulating fuel delivered to the engine, and when such accumulation reaches a predetermined value, providing a valve cleaning indication. This routine will proceed only during homogeneous air/fuel operation as indicated in step 206. Cleaning operation will occur only during homogeneous operation because a manifold vacuum is needed to draw fuel from the combustion chamber into the manifold vacuum as described later herein. Such vacuum will typically occur during homogeneous operation, where throttle plate 62 is in a partially closed position.

Proceeding with the flow chart shown in FIG. 3, additional fuel is injected during the overlap of intake valve 52a and exhaust valve 54a, as shown in step 210. The additional fuel is thereby drawn from combustion chamber 30, past intake valve 52a, into intake manifold 58. Subsequently, during the intake stroke, the additional fuel is drawn back from intake manifold 58, past intake valve 52a and the surrounding intake port to clean carbon deposits accumulated on and around intake valve 52a.

As shown in step 214, fuel which is injected during the intake stroke (INJ IS) is reduced in proportion to the additional fuel added during step 210 to avoid an increase in torque which might otherwise occur. The accumulated valve cleaning cycle time is then reset in step 216 and the routine exited.

This concludes the description of an example in which the invention is used to advantage. Those skilled in the art will recognize that many modifications may be practiced without departing from the spirit and scope of the invention. For example, the invention is applicable to both two-valve, three-valve, four-valve, and five-valve engines. Accordingly, it is intended that the invention be limited only by the following claims.

We claim:

1. A control method for a spark ignited four-stroke engine having multiple combustion chambers, each coupled to at least one intake and one exhaust valve, a fuel injection system for injecting fuel directly into each combustion chamber, and an electronically controlled throttle for throttling air inducted through an intake manifold into the combustion chambers, comprising:

detecting when to initiate an intake valve cleaning;

indicating when the engine is operating in a homogeneous mode wherein the throttle is partially closed and fuel is injected during an engine intake stroke to generate a homogeneous air/fuel mixture; and in response to said valve cleaning detection and said homogeneous mode indication, injecting additional fuel during a valve overlap of the intake and exhaust valves so that fuel is drawn into the intake manifold and subsequently inducted back into the combustion chamber past the intake valve.

2. The method recited in claim 1 wherein the engine comprises a two-valve engine having one intake valve per combustion chamber.

3. The method recited in claim 1 wherein the engine comprises a three-valve engine having two intake valves per combustion chamber.

4. The method recited in claim 1 wherein the engine comprises a four-valve engine having two intake valves per combustion chamber.

5. A control method for a spark ignited four-stroke engine having multiple combustion chambers, each coupled to at least one intake and one exhaust valve, a fuel injection system for injecting fuel directly into each combustion chamber, and an electronically controlled throttle for throttling air inducted through an intake manifold into the combustion chambers, comprising:

detecting when to initiate an intake valve cleaning;

indicating when the engine is operating in a homogeneous mode wherein the throttle is partially closed and a predetermined amount of fuel is injected during an engine intake stroke to generate a homogeneous air/fuel mixture;

in response to said valve cleaning detection and said homogeneous mode indication, injecting additional fuel during a valve overlap of the intake and exhaust valves so that fuel is drawn into the intake manifold and subsequently inducted back into the combustion chamber past the intake valve to clean valve deposits; and reducing said predetermined amount of fuel injected during the intake stroke by an amount proportional to said additional fuel injected during said valve overlap.

6. The method recited in claim 5 further comprising a step of calculating desired torque to be produced by the engine and wherein said predetermined amount of fuel is calculated in relation to said desired torque.

7. The method recited in claim 5 wherein said homogeneous mode is substantially a stoichiometric air/fuel ratio.

8. The method recited in claim 5 wherein said homogeneous mode is substantially lean of a stoichiometric air/fuel ratio.

9. The method recited in claim 5 wherein said step of detecting when to initiate an intake valve cleaning comprises counting elapsed engine cycles.

10. The method recited in claim 5 wherein said step of detecting when to initiate an intake valve cleaning comprises accumulating fuel delivered to the engine.

11. A control system for a spark ignited four-stroke engine having multiple combustion chambers each coupled to at least one intake and one exhaust valve, comprising:
    a fuel injection system for injecting fuel directly into each combustion chamber;
    an electronically controlled throttle for throttling air inducted through an intake manifold into the combustion chambers;
    said control system operating the engine in a homogeneous mode by partially closing the throttle and injecting a predetermined amount of fuel during an engine intake stroke to generate a homogeneous air/fuel mixture;
    said control system detecting when to initiate an intake valve cleaning; and
    in response to said valve cleaning detection and while operating in said homogeneous mode, said control system injecting additional fuel during a valve overlap of the intake and exhaust valves so that fuel is drawn into the intake manifold and subsequently inducted back into the combustion chamber past the intake valve to clean valve deposits.

12. The system recited in claim 11 wherein said control system reduces said predetermined amount of fuel injected during the intake stroke by an amount proportional to said additional fuel injected during said valve overlap.

13. The control system recited in claim 11 wherein said homogeneous mode is substantially a stoichiometric air/fuel ratio.

14. The control system recited in claim 11 wherein said homogeneous mode is substantially lean of a stoichiometric air/fuel ratio.

15. The control system recited in claim 11 wherein detecting when to initiate an intake valve cleaning comprises counting elapsed engine cycles.

16. The control system recited in claim 11 wherein detecting when to initiate an intake valve cleaning comprises accumulating fuel delivered to the engine.

* * * * *